Feb. 27, 1951   E. W. KAUFMANN   2,543,528
COFFEE MAKER
Filed Oct. 26, 1948   2 Sheets—Sheet 1
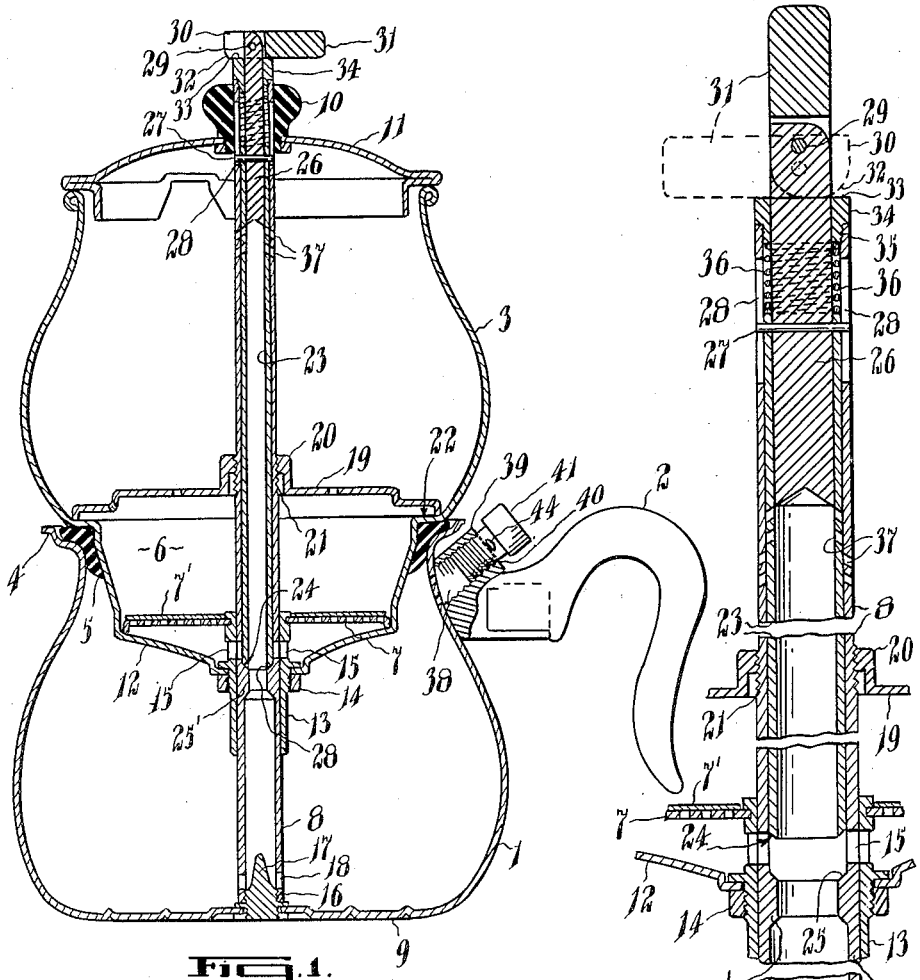
Inventor
Emma Wilhelmina Kaufmann
by Frederick C. Bromley
ATTY

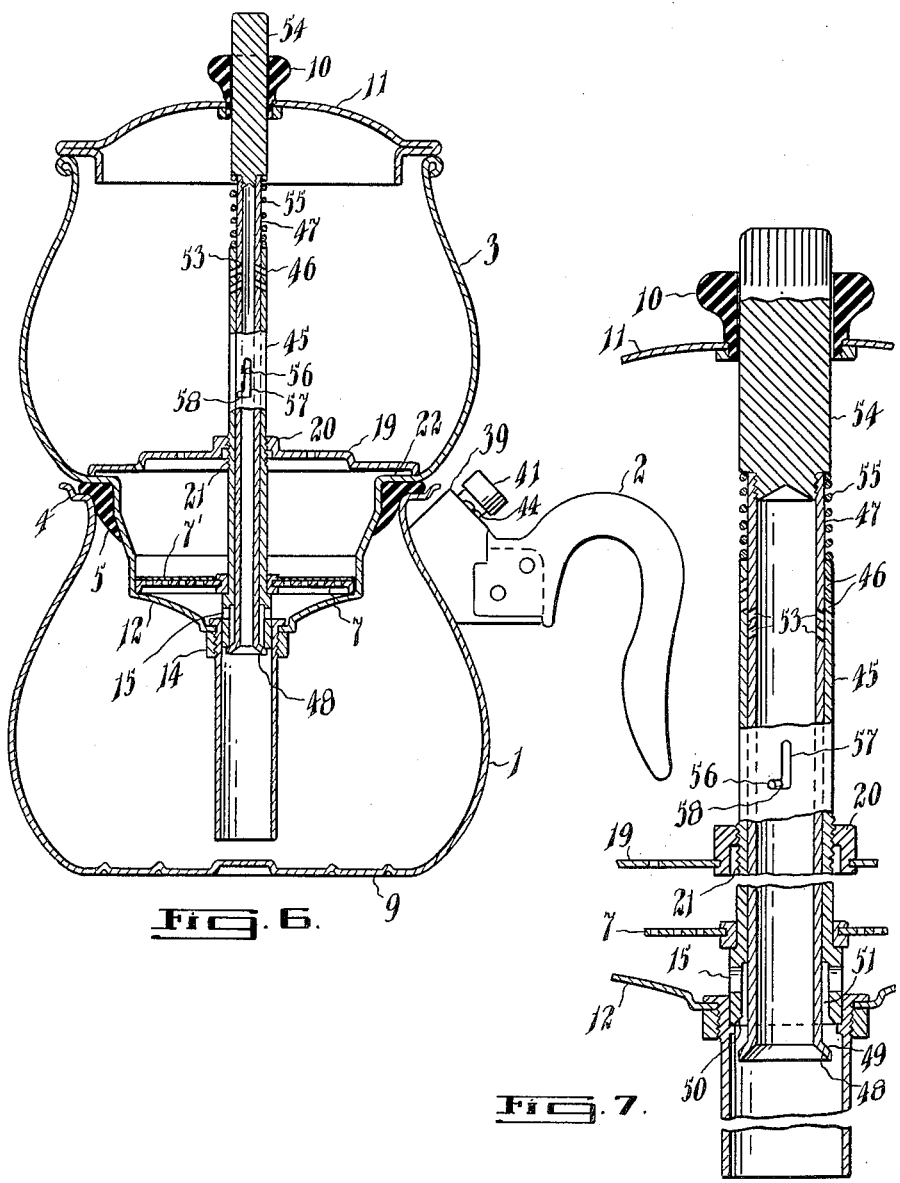

Patented Feb. 27, 1951

2,543,528

UNITED STATES PATENT OFFICE 2,543,528

COFFEE MAKER

Emma Wilhelmina Kaufmann, Toronto, Ontario, Canada

Application October 26, 1948, Serial No. 56,610

1 Claim. (Cl. 99—292)

My invention relates to improvements in coffee makers and particularly to the vacuum type of coffee maker having upper and lower separable containers. In beverage brewers of this kind heated liquid is forced upwardly from the lower container into the upper container to act on the granular ingredients and as the beverage is brewed it flows into the lower container ready for use. A strainer or filter serves to separate the granular ingredients, to wit, the coffee grounds from the brewed beverage.

In prior art appliances a filter paper or cloth extends over a filter plate to support a bed of coffee grounds in spaced relation to the bottom of the upper container so that the brewed beverage may gravitate through a perforated eduction tube into the lower container. While water is being heated in the lower container vapor and steam pass through the perforated eduction tube into the space below the filter plate and impair the filtering agent especially when this agent is a filter paper. Hence when the boiled water is subsequently forced upwardly into the upper chamber in a brewing operation the filter paper is in a less efficient condition for filtering.

It is therefore an important object of the present invention to provide valve means for closing the perforations in the eduction tube while the water is being heated in order that vapor and steam may not pass into the space below the filter plate and deteriorate the filter paper before use is made of the same. It has been demonstrated that a coffee maker constructed in accordance with the present invention is highly efficient in that the brewing process is much quicker and that the beverage has desirable strength of flavor. Moreover it has beverage strength, which enhances its quality and produces a coffee having a delicious and rich flavor.

Preferably said valve means is provided with an operating handle or lever exposed above the lid of the upper container where it is readily accessible for manipulation in order to permit the filtered beverage to gravitate into the lower container.

A further and important feature of the invention is to provide the lower container with a whistle constructed to serve as a vent for air whereby unboiled water is prevented from being forced upwardly into the upper container. The whistle is arranged to be turned from an open to a closed position. When in open position it not only vents the lower container but also signals when the boiling water begins to flow into the upper container, and when the boiling water has been completely transferred the whistle operates again due to the vacuum created in the lower container, thus indicating that it is now time to shut off the heating medium and to open the valve so that the brewed liquid may gravitate into the lower container. A whistle of this kind is particularly desirable in the event that the coffee maker is heated by a hot plate which is slow in heating. In the use of such a hot plate the whistle can be closed when the first signal is given so that steam cannot continue to escape through the vent, which expedites the building up of pressure within the lower container for the upward flow of the heated water.

The invention provides a coffee maker which is highly efficient and serviceable, and one which is economical in that less coffee grounds per cup is required.

The invention is illustrated in the accompanying drawings, in which

Fig. 1 is a sectional elevation of a coffee maker embodying the present invention.

Fig. 2 is an enlarged vertical section thereof showing the eduction tube and the valve means for controlling the openings therein through which the brewed beverage passes to the lower container. In this view the valve is in open position.

Fig. 3 is a top plan view of the handle of the valve.

Fig. 4 is a view, partly in section, of the whistle.

Fig. 5 is an aspect of the plug element of the whistle.

Fig. 6 is a vertical sectional view of the coffee maker showing a modified form of the invention, and Fig. 7 is an enlarged vertical section thereof depicting the eduction tube assembly including the valve means, the valve being indicated in open position.

In carrying out the invention suitable lower and upper containers are provided. The lower container 1 is supplied with the customary handle 2 at one side thereof, which handle is of the approved type. The upper container 3 is removably seated on the mouth portion 4 of the lower container by means of the usual fluid-tight connection afforded by a sealing gasket 5.

The reduced lower end of the upper container furnishes a compartment 6 for the coffee grounds which are supported on the filter plate 7. The filter plate is a perforated member over which extends a filter paper 7'.

In the preferred form of the invention, Figs. 1 and 2, the eduction tube 8 extends upwardly from the bottom 9 of the lower container to the top of the upper container where it extends loosely through the apertured knob 10 of the lid 11. Said eduction tube is securely attached to the bottom wall 12 of the upper container as by a fitting 13 including a nut 14. The fitting 13 is used to secure the filter plate 7 to the eduction tube so as to form a unit therewith which can be removed from the upper container by means of the nut 14. Said filter plate is thus rigidly supported on the eduction tube in spaced relation to the bottom wall 12 in order that liquid may freely pass therethrough and flow to and through openings 15 in the walls of the eduction tube and the fitting 13, which provides for the return of liquid from the upper container to the lower container in well-known manner. The bottom wall 12 is shown as sloped toward the eduction tube so that the space below the filter plate will constitute a sump for liquid in passing into the eduction tube through the openings 15.

The lower end of the eduction tube is internally threaded as at 16 and screwed onto a spigot 17 rigid with the bottom wall 9. This screw connection firmly attaches the upper container to the lower container and effectively seals the junction of these members. The eduction tube adjacent its lower end is provided with openings 18 which form passages for liquid.

A distributor plate 19 is disposed over the bed of coffee grounds and encloses the compartment 6. The distributor plate is provided with an internally threaded hub portion 20 which is screwed on threads 21 provided on an enlarged diameter of the eduction tube. The rim portion of the distributor plate seats on the ledge section 22 of the upper container in order to confine the granular ingredients in the compartment 6. The distributor plate can be unscrewed and removed from the upper container for insertion and removal of the coffee grounds.

Various valve means may be employed to control the openings 15, which provide return ports for the liquid. However in the preferred form of the invention the valve means takes the form of an inner slide rod 23 which is tubular and loosely mounted in the eduction tube to move endwise therein. The lower end is beveled to form a valve face 24 engageable with a valve seat 25 of a similar shape which is provided on a diametrically reduced section 25' of the eduction tube. The valve seat 25 is located somewhat below the ports 15 and the slide rod extends upwardly therefrom and terminates in the vicinity of the mouth of the upper container. The upper end of the slide rod is closed by a plug 26 secured thereto as by a transverse pin 27 whose ends are slidably engaged in diametrically opposite elongated slots 28 cut in the upper end of the eduction tube. The pin and slot connection prohibits the slide rod from turning independently of the eduction tube but does not prevent its sliding therein. The plug 26 projects through the lid 11 and its upper end is pinned as at 29 to the bifurcated end 30 of a cam lever 31, which cam lever has a cam face 32 engageable with the top face 33 of a ring 34 encircling the plug 26 and secured on the upper end of the eduction tube as by a screw connection 35. The cam face 32 is suited to raise the slide rod away from the valve seat 25 and to uncover the ports 15 when the cam lever 31 is upwardly swung from the transverse position shown in Fig. 1 to the vertical position depicted in Fig. 2, thus opening said ports. When the cam lever is in said transverse position the slide rod is held seated against the valve seat 25 by means of a helical compression spring 36 which encircles the plug 26 and is shouldered between the ring 34 and the upper end of the slide rod. In this position of the cam lever it serves as a handle by which the eduction tube can be screwed on and off the spigot 17 for attachment and removal of the upper container. Additionally, in this position holes 37, provided in the eduction tube and the slide rod, are aligned to permit boiling water to be forced upwardly into the upper container.

With this arrangement and assuming that the appliance is in assembled condition as shown in Fig. 1 with water and coffee introduced, on heating the water there is no possibility of vapor and steam entering the space beneath the filter plate and attacking the filter paper because the ports 15 are closed by the slide valve 23. When the water boils the slide valve is opened by manually raising the cam lever 31, which opens the ports 15 and allows the brewed beverage to flow down the eduction tube into the lower container.

The whistle, which is provided on the lower container, comprises an open ended passage 38 formed in an element 39 of the handle 2 and communicating with the interior of the lower container above the water line. This passage is internally threaded and has screwed in it a hollow whistle element 40 which is open to the passage 38 at its inner end and closed at its outer end by a knob part 41. Within the element 40 is a plug 42 recessed at 43 for passage of steam. The recesses are aligned with apertures 44 above the plug for producing a whistling noise when steam passes therethrough. When the apertures 44 are uncovered, as shown in Figs. 1 and 4, the whistle is in an open position in which it serves as a vent to prevent unboiled water from being forced upwardly through the eduction tube into the upper container. In the open position of the whistle it also serves to signal when boiling water begins to flow into the upper container. When the element 40 is screwed in to cover the apertures 44 the whistle is in a closed position.

In the modified form of the invention shown in Figs. 6 and 7, the eduction tube, designated by 45, is not attached in any way to the lower container, but is terminated a suitable distance short of the bottom thereof. The upper container is a snug fit on the lower container which is effected by the sealing gasket 5 in a manner common to coffee makers of a known kind.

The eduction tube 45 is secured to the upper container in a manner previously described and extended upwardly therein to terminate short of the mouth thereof. At its upper end the wall thereof is perforated as at 46 to supply egress openings through which boiled water may pass into the upper container.

The inner tube 47 is a slide fit in the eduction tube and constitutes a slide valve. It extends completely through the eduction tube and has a flared lower end 48 which provides a valve face 49 that is engageable with the valve seat 50 formed by the beveled lower end of the eduction tube. Said lower end of the eduction tube is diametrically enlarged to provide a passage 51 extending to the ports 52 which communicate with the space below the filter plate 7 so that the brewed beverage may flow through the eduction tube into the lower container when said slide valve is opened—as shown in Fig. 7. The upper end of said slide valve is supplied with perforations 53 which are aligned with the perforations 46 when the slide valve is in closed position, as shown in Fig. 6. In this position boiled water is forced into the upper container through the passage provided by the bore of the slide valve.

The upper end of the slide valve is closed by a plug 54 which is screw connected or otherwise attached thereto and is of a round cross section corresponding in diameter to the outside diameter of the eduction tube. The plug 54 projects loosely through a hole in the knob 10 of the lid 11 and constitutes a handle by which the slide valve may be depressed to an open position and turned for locking it in this position. The slide valve is retained in closed position as by a helical compression spring 55 which is seated against the upper end of the eduction tube and the lower end of the handle 54. Locking means is provided to secure the slide valve in open position. Such locking means is shown by way of example as consisting of a pin 56 projecting from a side of slide valve and engaged in an elongated slot 57 in the eduction tube having a bent lower end 58. It will be understood that by using the handle 54 the slide valve can be depressed to open it and when open it can be locked by merely turning it to cause the pin 56 to engage the bent end 58 of the slot 57.

From the foregoing it will be manifest that the slide valve is kept in closed position until the water boils and then is forced into the upper container by pressure generated in the lower container. When the water has been transferred to the upper container the slide valve is opened so that the filtered beverage may drain into the lower container. According to the invention there is provided manual valve means for controlling the down flow passages 15 through which the filtered beverage is conducted to the lower container.

The invention is simple in construction and operation. It is intended that such changes and modifications may be resorted to as fairly come within the scope of the appended claim.

What I claim is:

A coffee maker comprising a lower container, an upper container seated on the mouth portion thereof by means of a reduced bottom end forming a compartment for coffee grounds, an eduction tube centrally carried by said upper container and upwardly extended therethrough, said eduction tube having a screw connection at its lower end with said lower container and being perforated at said lower end, said eduction tube also being perforated immediately above the bottom of said upper container to provide a port for down-flow of liquid, a filter plate supported on said eduction tube above said port and within said compartment, a filter paper extended thereover, a tubular rod slidably fitted in said eduction tube and constituting a slide valve for controlling said port, said tubular rod being extended upwardly from said port and having an opening in its side wall at its upper end which communicates with an opening provided in said eduction tube for passage of heated water into said upper container, and means for manually sliding said tubular rod and retaining it in lowered and raised positions including a handle element.

EMMA WILHELMINA KAUFMANN.

REFERENCES CITED

The following references are of record in the file of this patent:

UNITED STATES PATENTS

| Number | Name | Date |
|---|---|---|
| 259,580 | Ohm | June 13, 1882 |
| 1,112,598 | Cook | Oct. 6, 1914 |
| 1,195,487 | Maignen | Aug. 22, 1916 |
| 1,843,241 | Pouget | Feb. 2, 1932 |
| 1,895,857 | Mockbee | Jan. 31, 1932 |

FOREIGN PATENTS

| Number | Country | Date |
|---|---|---|
| 663,218 | France | Apr. 8, 1929 |